United States Patent
Sahuc et al.

(10) Patent No.: US 7,272,791 B2
(45) Date of Patent: Sep. 18, 2007

(54) DEVICE, METHOD AND SYSTEM FOR MULTIMEDIA CONTENT ADAPTATION

(75) Inventors: David Sahuc, Rennes (FR); Paul Kerbiriou, Thorigne Fouillard (FR); Thierry Viellard, Osse (FR); Jean-Claude Chevet, Betton (FR)

(73) Assignee: Thomson Licensing, Boulogne-Billancourt (FR)

( * ) Notice: Subject to any disclaimer, the term of this patent is extended or adjusted under 35 U.S.C. 154(b) by 304 days.

(21) Appl. No.: 10/494,719

(22) PCT Filed: Oct. 22, 2002

(86) PCT No.: PCT/EP02/11808

§ 371 (c)(1),
(2), (4) Date: May 6, 2004

(87) PCT Pub. No.: WO03/041396

PCT Pub. Date: May 15, 2003

(65) Prior Publication Data

US 2004/0263530 A1 Dec. 30, 2004

(30) Foreign Application Priority Data

Nov. 6, 2001 (EP) ................... 01460067

(51) Int. Cl.
*G06F 17/00* (2006.01)

(52) U.S. Cl. .................. 715/523; 709/231; 375/240.12

(58) Field of Classification Search ............. 715/500.1, 715/501.1, 522, 523, 526; 709/231; 375/240.12
See application file for complete search history.

(56) References Cited

U.S. PATENT DOCUMENTS 5,802,315 A * 9/1998 Uchiumi et al. ............. 709/247
5,953,506 A * 9/1999 Kalra et al. .................. 709/231
(Continued)

FOREIGN PATENT DOCUMENTS

EP 961490 12/1999
(Continued)

*Primary Examiner*—Doug Hutton
*Assistant Examiner*—James H Blackwell
(74) *Attorney, Agent, or Firm*—Joseph J. Laks; Ronald H. Kurdyla; Joel M. Fogelson

(57) ABSTRACT

The invention concerns a device receiving data associated with a first profile and generating data associated with a second profile, comprising means to extract facts associated with the first profile, means to extract facts associated with the second profile, a set of rules describing a way to modify facts associated with said first profile into facts associated with said second profile, means to analyze said facts associated with the first profile and said facts associated with the second profile, means to modify facts associated with said first profile into facts associated with said second profile according to said set of rules. The device is characterized in that it comprises, means to request additional rules when said set of rules does not allow to modify facts associated with said first profile into facts associated with said second profile.

13 Claims, 2 Drawing Sheets

U.S. PATENT DOCUMENTS

| | | | |
|---|---|---|---|
| 5,960,126 A * | 9/1999 | Nielsen et al. | 382/298 |
| 5,983,247 A * | 11/1999 | Yamanaka et al. | 715/526 |
| 5,996,022 A * | 11/1999 | Krueger et al. | 709/247 |
| 6,345,279 B1 * | 2/2002 | Li et al. | 707/104.1 |
| 6,457,030 B1 * | 9/2002 | Adams et al. | 715/523 |
| 6,542,546 B1 * | 4/2003 | Vetro et al. | 375/240.12 |
| 6,564,263 B1 * | 5/2003 | Bergman et al. | 709/231 |
| 6,647,061 B1 * | 11/2003 | Panusopone et al. | 375/240.12 |
| 6,925,595 B1 * | 8/2005 | Whitledge et al. | 715/513 |
| 6,970,602 B1 * | 11/2005 | Smith et al. | 382/232 |
| 7,031,965 B1 * | 4/2006 | Moriya et al. | 707/10 |
| 2001/0047517 A1 * | 11/2001 | Christopoulos et al. | 725/87 |

FOREIGN PATENT DOCUMENTS

| | | |
|---|---|---|
| WO | 00/68840 | 11/2000 |

* cited by examiner

DEVICE, METHOD AND SYSTEM FOR MULTIMEDIA CONTENT ADAPTATION

This application claims the benefit, under 35 U.S.C. §365 of International Application PCT/EP02/11808, filed Oct. 22, 2002, which was published in accordance with PCT Article 21(2) on May 15, 2003 in English and which claims the benefit of European patent application No. 01460067.0, filed Nov. 6, 2001.

FIELD OF THE INVENTION

The invention concerns a device and a method to adapt multimedia content to different terminals.

More particularly, the invention allows the dynamic adaptation of multimedia content to different terminal profiles.

The invention is particularly interesting in the MPEG-4 domain where a certain number of profiles are defined according to different terminals capabilities.

BACKGROUND OF THE INVENTION

In the context of multimedia design, several kinds of heterogeneous terminals are supposed to be able to receive and recover content provided by the same server.

However, the terminals have different capabilities, in terms of hardware or software functionalities. These terminals can be desktop personal computers, laptop computers, personal digital assistant (PDA), portable phones, or digital television receivers. As it is easily understandable and well known, these terminals cannot read the same content. As a simple example, one can easily understand that these terminals cannot each display a same image with the same resolution.

The MPEG-4 standard (defined in the document ISO/IEC 14496-1:2001 Systems) consortium has defined a number of profiles according to devices that have to be MPEG-4 compliant. The profiles are defined in the document N3932 "New MPEG-4 Profiles Under Consideration".

For example, some PDAs will be able to play only MPEG-4 compressed audio/video contents and some MPEG-4 compliant computers will be able to play all MPEG-4 profiles.

The problem of MPEG-4 content creators is to design content that is understood by platforms that do not comply with the profile of the received content. A content created for some specific MPEG-4 profiles cannot be displayed on platforms that do not comply with the content's profiles or at least not on those that comply with a profile of a lower level. Moreover, the number of defined profiles is quite important as each profile is also split into different levels, each level defining parameters such as visual resolution or a data rate for instance.

The document "Design of a framework for dynamic content adaptation to web-enabled terminals and enterprise applications" published in the proceedings of the Sixth Asia Pacific Software Engineering Conference pages 72 to 79 concerns a method to adapt content to terminals having different capabilities. A solution that selects, deletes or converts each element of a web document's contents appropriately according to the type of devices is proposed. Despite the fact that the document describes a dynamic adaptation system, the adaptation is carried out at the transmitter, resulting in many different versions of the content to be transmitted.

This solution is not adapted to a system comprising a great number of terminals, where it is desirable to send a same content to the largest possible number of terminals, or a system in which the transmitter has no advance knowledge of parameters stored in a particular terminal.

BRIEF SUMMARY OF THE INVENTION

The inventors have found that it should be interesting to have a system that allows a dynamic content adaptation in multicast transmissions, when several predefined contents are generated according to different profiles and delivered to different heterogeneous terminals that are not compliant to the profile of the delivered content.

The invention proposes a solution based on conversion rules, and that allows modifying the rules dynamically. This solution is particularly interesting in systems where a great number of profiles are defined and where loading, by a terminal, of a complete solution that allows to convert all profiles in each terminal is costly in terms of resource consumption and cost.

The object of the invention is a device for multimedia content adaptation receiving input data associated with at least a first profile and generating output data associated with at least a second profile. The device comprises:

means to extract facts associated with a first profile,
means to extract facts associated with a second profile,
a set of rules describing a way to modify the input data according to the facts associated with said first profile and to the facts associated with said second profile,
means to modify the input data to fit with the facts associated with said second profile according to said set of rules.

According to the Invention, the Device Comprises:

means to request additional rules when said set of rules does not allow to modify the input data to fit with the facts associated with said profile into facts associated with said second profile according to said set of rules.

Having a set of rules that can be modified according to the received content and to the profile of the terminal reduces the required memory capacity in the terminal. The invention is particularly interesting in—but not limited to—a system allowing different profiles, each profile being split into several levels. As a function of the received content, new rules are generated that will allow the conversion of more complex functions in case this should be required. Thanks to this interactivity between the receiving terminal and the outside, it is possible to enrich the set of rules with new rules and thus to convert all the functions, even specific facts that are not necessarily often used and that would not require permanent storage of dedicated rules.

The invention can be used in—but is not limited to—networks connecting several multimedia terminals, which generate several contents according to different profiles.

In a preferred embodiment, the device includes means to store said set of rules and said additional rules.

According to an embodiment of the invention, it is proposed to use a system able to learn new rules when the existing rules are not sufficient, e.g. an expert system.

This feature concerns particularly devices having little memory capacity such as portable phones or personal digital assistants. In this case, a set of basic rules can be first implemented in the device and if it is not sufficient to make the conversion, additional rules are requested.

This is particularly interesting if a device receives regularly content written according to a particular profile. The set of rules necessary for adapting the content being in this case often used, it is time saving to maintain the appropriate rules in the device for future use.

In another embodiment, said set of rules and said additional rules are received with the content.

This is particularly suitable for devices having no storage capacity to permanently store said set of rules and said additional rules.

According to an embodiment of the invention, the means to request additional rules send a request to a user.

In case new profiles are defined or multiple adaptation solutions exist, it is interesting to enable the user to have the possibility to choose among the multiple conversion possibilities. According to the users' preferences, for instance, he can prefer having a polygon converted in a circle rather than converted into a rectangle. The preferences of the user are rules that may help the conversion of future contents and therefore can be memorized in the device.

According to an embodiment of the invention, the device according to the invention is connected to one multimedia terminal.

Connecting the devices to multimedia terminals is particularly advantageous. Preferentially, the device can be fully part of the multimedia terminal instead of being connected to it through an external link.

According to an embodiment of the invention, said multimedia terminal is linked to a server through a network and said server sends said input data according to a plurality of profiles, and said means to request additional rules sends a request to said server.

The invention is particularly interesting in such a client-server environment where a server transmits the data to all the client terminals.

Preferentially, said additional rules depend on the current profile of said multimedia terminal.

The device can request additional rules in order to complete the set of rules already stored in its memory and enabling to convert the facts associated with the profile of the incoming data into facts associated with its profile. A terminal can be for instance configured according to one profile at one instant and its configuration can be changed according to network characteristics or other external or internal parameters. So, according to this change of configuration, the terminal can need other rules for the adaptation to this new profile.

In a particular embodiment, said set of rules and said additional rules are classified according to a priority order.

In some cases, it can happen that several rules enable the conversion of the facts associated with the first profile into facts associated with the second profile. In this case, it is particularly convenient to decide which rule must be applied. The rules can be classified by the user. The classification can also be based on statistics of the user's last choices.

According to a particular embodiment of the invention, the profiles are defined according to MPEG-4 profiles definition.

In MPEG-4, profiles are strictly defined for each part of the standard:
Video
Audio,
Graphics
Scene graph
DMIF (standing for <<Delivery Multimedia Integration Framework>>)
OD (standing for "Object Descriptor")
MPEG-J Each profile defines a set of functionalities that should be sufficient for a certain applicative purpose, for instance for video on demand or quality of service requirements.

In MPEG-4, the profiles are also split into several levels. Levels define the complexity of profiles. Combination of profiles and levels define a device performance (processing power, graphics capabilities, memory for instance).

The invention concerns also a system comprising at least one device according to any of the embodiments of the invention, one first device generating an output content compliant to said first profile and sent to at least one second device that can understand an input content compliant to a said second profile.

According to the invention, the device according to any embodiment of the invention receives said output content compliant to said first profile and generates an output content compliant with a said second profile for said second device.

The invention relates also to a server for multimedia content adaptation comprising means to send data to at least one client terminal, said data being associated with at least a first profile and said client terminal being compliant to at least a second profile, said client terminal comprising a set of rules for converting said data associated to a first profile into data associated to said second profile.

According to the invention, the server comprises also means to send additional rules to at least one of the client terminal upon request of said client terminal when said client terminal can not convert said data associated to the first profile into data associated to the second profile.

The invention relates also to a method for multimedia content adaptation comprising the steps of
receiving input data associated with a first profile,
generating output data associated with at least a second profile,
extracting facts associated with the first profile,
extracting facts associated with the second profile,
describing, with a set of rules, a process for modifying facts associated with the first profile into facts associated with the second profile,
analyzing said facts associated with the first profile and said facts associated with the second profile,
modifying facts associated with said first profile into facts associated with said second profile according to the set of rules.
requesting additional rules when the set of rules does not allow modifying facts associated with said first profile into facts associated with said second profile according to said set of rules.

The invention relates also to a computer program product comprising program code instructions to execute the method according to the invention when this program is executed on a set-top box or on a digital television receiver.

Other characteristics and advantages of the invention will appear through the description of a non-limiting embodiment of the invention, which will be illustrated, with the help of the enclosed drawings among which:

DETAILED DESCRIPTION OF THE INVENTION

The present embodiment uses MPEG-4 profiles, but other types of profiles may also be used. When the term profile is used in the description, this also includes the notion of level.

The recent definition of profiles in the MPEG-4 consortium has stressed the idea that despite a single content is generated, a lot of heterogeneous terminals should be able to read it as more and more the use of multimedia content has to be read by several terminals. Therefore, the invention is particularly relevant when applied to MPEG-4.

Figure 1:
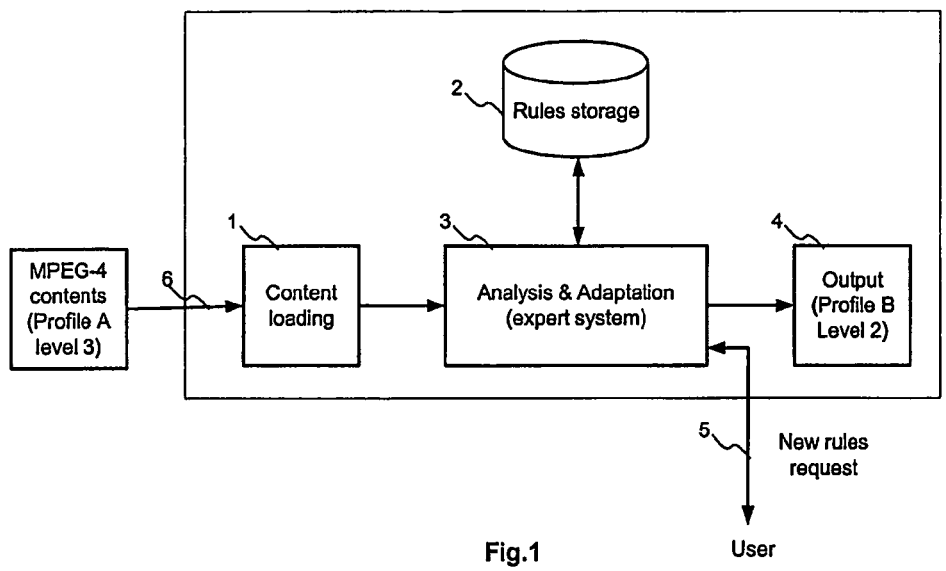
FIG. 1 is a block diagram representing a device according to the embodiment of invention.

A device according to the present embodiment is represented on FIG. 1. The device includes a content loading module 1 connected to an analysis and adaptation system 3 and to an external link 6. The analysis and adaptation system 3 is also connected to a rules storage means 2 and to an output module 4. The rules storage means enable a permanent storage of the rules. The rules storage means 2 is optional and in another embodiment the rules can be transmitted with the content as described later in this document. and deleted once used.

In a preferred embodiment, as represented, the adaptation module is also connected to the user through a connection link 5.

According to the present embodiment, the external link 5 is a wireless remote control, while the device is part of a television receiver. Of course, the invention is not limited to this environment. The devices are preferentially included in electronic devices such as personal computers, personal digital assistants, television sets or any other multimedia terminal and these multimedia terminals can be connected.

The device receives content from the external link 6. According to the present embodiment, this link is an Internet connection.

In the preferred embodiment described here, the content is MPEG-4 compliant. The content is written according to the different profiles defined by the MPEG-4 standardization committee. Each profile is also split into several levels.

Figure 3:
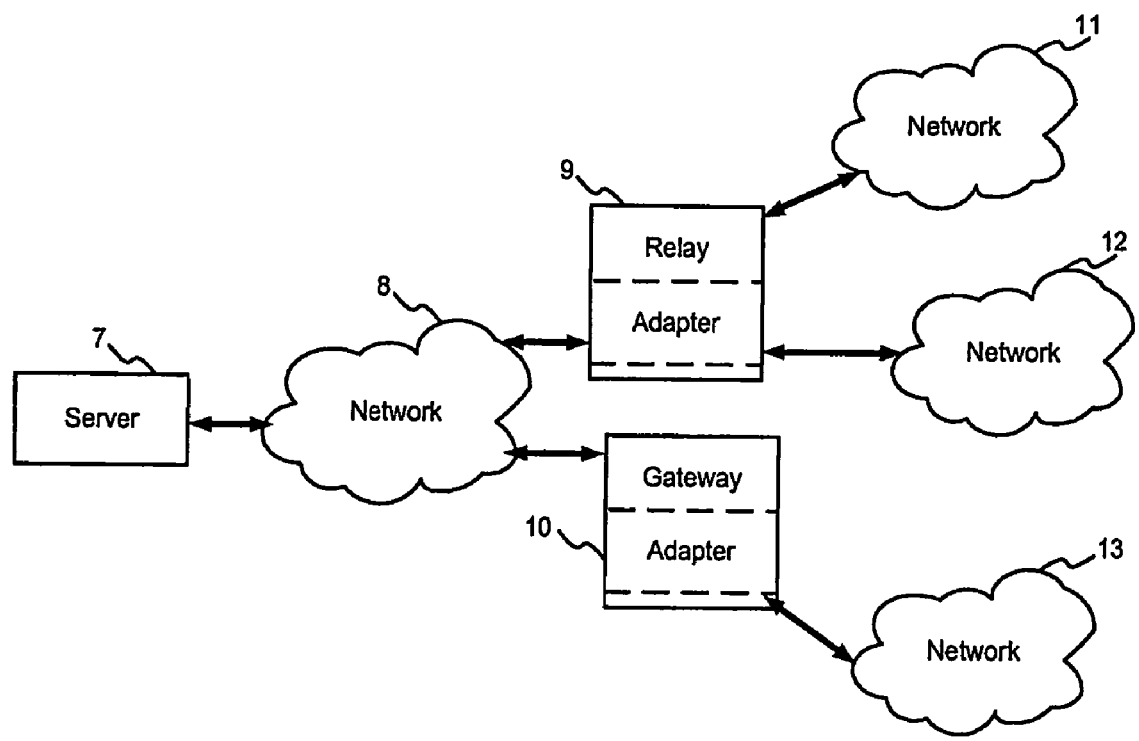
FIG. 3 is a block diagram representing a system according to a particular embodiment of the invention.

A server, as shown on FIG. 3, connected to several devices, generates the content.

According to a variant embodiment, the content is generated by a device and broadcast by the server to other devices of the network.

The generated content complies with one profile, which is not necessarily the profile of all the addressees of the content and thus must be converted in order to be understood and/or displayed by each addressee.

The content loading module 1 may have also to decode the content (e.g. when it is compressed). The decoding consists for instance in separating the different components of the MPEG-4 scene into the video, the audio, the graphics elements.

The content loading module transmits the content to the analysis and adaptation system, which splits it into several components, corresponding to the profile tools (audio, video , . . . ). An example, in the case of an MPEG-4 content, is given by FIG. 2.

Once the content is split, the analysis and adaptation module extracts facts from this modified content in order to apply the rules stored in the storage module 2. These rules enable to convert the content defined according to the initial profile into a content that can be understood by the television receiver into which the device is embedded. The profile can be defined as a set of facts such as the size of the display if it is a content that has to be displayed. For instance, facts provided by the terminal can be the size of the display, the number of colours it can display, the resolution etc . . .

The rules stored in the rules storage means 2 enable to modify the content by modifying the different facts defined and converting them into facts corresponding to the terminal profile.

A simple rule can be for instance:

If terminal size is 50*10 and the input content is defined as 100*20, apply a scale of ½ on original content.

The adaptation module may have multiple choices depending on the facts extracted from the input content. According to a variant embodiment, rules are ranked according to a priority criterion. For instance, if at one time a user's opinion is requested to select a rule among a plurality of rules, this user preference is memorized and the rules are classified according to statistics based on the user's previous choices.

According to a variant embodiment, additionally, internal rules are added for optimisation purpose, for instance, in MPEG-4, "removing or deleting empty nodes". The nodes describe audio-visual primitives and their attributes, along with the description of the scene graph itself.

According to a variant embodiment, some rules are deleted in the device according to the profile of the terminal associated with the device according to the invention. Indeed, some rules can be useless if the terminal never receives content of a given profile. This can be interesting for low profile terminals, which are generally associated with low software or hardware capabilities and may therefore have little memory.

According to the content received, some of the extracted facts may not have any corresponding fact according to the terminal's profile. This can happen in the case of a content defined according to a high level profile and a terminal complying with a low level profile, having little resources.

In this case, the rules storage means may not contain conversion rules that could convert facts according to the high level profile. Also, a previously present rule may have been deleted.

According to the present embodiment, the missing rules are requested by the device through the external link 6 from the server. The server responds by sending back the rules to the device.

Figure 2:
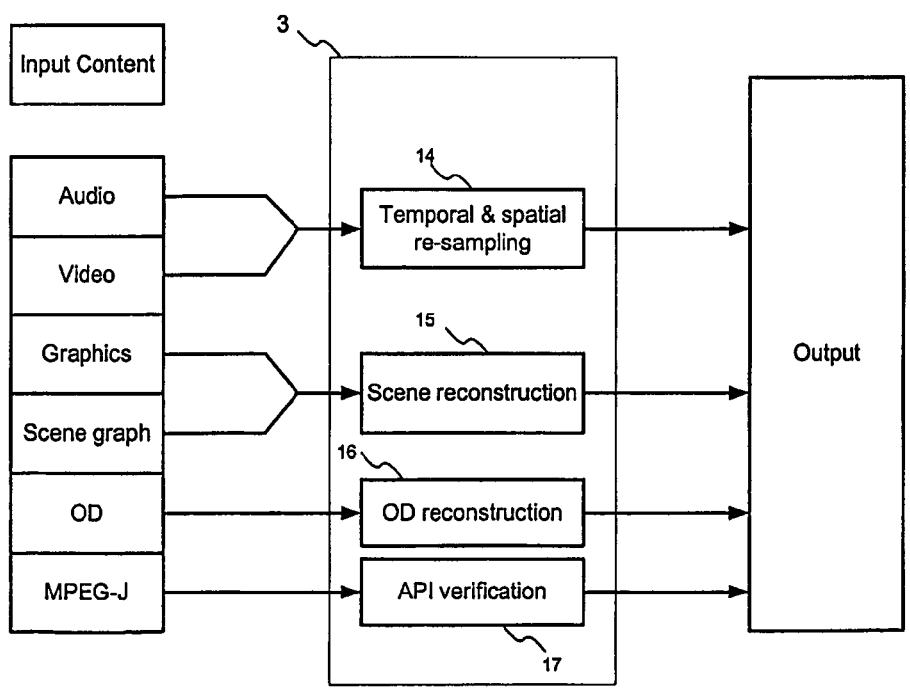
FIG. 2 is a block diagram describing the adaptation in case of content compliant to the MPEG-4 standard.

When the device receives an incoming content, it converts this content into the different objects, as explained on FIG. 2. It extracts the different facts from these objects. Then, it puts in accordance with these facts the facts associated with the output profile. When there is no fact that can be put in accordance, the device cannot find any rule to make the conversion. It requests then to the server a rule, or a set of rules, that enable the conversion. This request is transparent for the user and real time.

According to a variant embodiment, the rules are requested by the device from the user through the external link 5. The user can then help the adaptation module with the conversion by entering an indication to the device. The device proposes for instance several choices to the user and the user makes the choice. Then the choice is converted into a rule such as "convert a polygon into a rectangular".

It means that according to different embodiments, either link 5 or link 6 can be available.

On FIG. 2, a decomposition of an MPEG-4 content is represented as well as the functional description of the adaptor.

The content is separated into the different elements, audio, video, graphics, scene graph, object descriptors and MPEG-J.

The adaptor includes at least 4 modules: a module 14 for temporal and spatial resampling, a module 15 for scene reconstruction, a module 16 for object descriptor reconstruction and a module 17 for API (acronyme anglais de "application and programming interface significant "interface pour la programmation d'applications") verification.

The module 14 of temporal and spatial re-sampling adapts for instance the size or the shape (or any other geometrical feature of the input content extracted from the input facts to the output profile according to the facts. For instance, let's suppose that the input content contains a polygonal shape and the output profile contains facts indicating that any-authorized shape has to be rectangular.

The temporal and spatial re-sampling module 14 adapts the size of a video stream or its frame rate, depending on the input facts and facts of the output profile.

The scene reconstruction sub-module 15 reconstructs a scene that is coherent with the input scene but adapted to the output Scenegraph and graphics profiles. The output Scenegraph represents the architecture of the scene.

For instance, if the input content contains a polygonal shape and the output profile contains facts such as authorized shape is rectangular, the module 15 defines a rule that converts a polygonal shape into a rectangular shape.

The Object descriptor reconstruction module 16 provides the glue between the scene description provided by the scene reconstruction sub-module 15 and the streaming resources.

The API verification module 17 checks that the content is compliant with the output profile.

According to this embodiment of the invention, the different functionalities included in the analysis and adaptation system 3 are executed as computer program instructions.

The set of rules included in the rule storage means 2 can be modified and therefore can be upgraded without the need of a compilation. They can be downloaded as software can be or they can be modified each time a new rule is added upon request of the device to the server. This enables a dynamic adaptation not dedicated to one terminal but that can be adapted to every terminal including such a device.

On FIG. 3, a system including several devices according to a present embodiment is represented.

This figure represents a particular embodiment where several networks are inter-connected through several gateways and connected to the same server.

This specific embodiment shows the devices distributed in the networks instead of integrated into other apparatus. This allows implementing the invention using existing terminals. One particularly interesting configuration is to group the terminals according to their profiles on the same network. In this case, a server 7 sends one content designed according to one profile on a network 8. The content is received by the different gateways or relays 9, 10 and transmitted to the addressees connected to the different networks 11, 12, and 13. As previously said, if the terminals connected to the network 11 comply with a unique profile, it is particularly interesting to have the adapter located in the gateway, so that the adapter makes the conversion only once for all the terminals. The adapter, in this case, can learn easily the type of profile the terminals located on the network comply with and learn the appropriate rules. The adapter can contain an expert system able to learn new rules. One condition for sending the same content for all the terminals in this case is that all the users if they are asked for it, give the same information to the adapter. This seems to be unrealistic. According to the present embodiment, a single master terminal is designed to help the adapter with the conversion, only if necessary. In a preferred embodiment, in the case of an IEEE-1394 network, the master terminal can be for instance the cycle master terminal.

According to a variant embodiment, the rules (base rules and additional rules) are sent with the content. This is particularly suitable for adapters having no memory. The server can send the same content to the different adapters 9 and 10 and send to these adapters different rules according to the terminals on the networks 11, 12 and 13.

Advantageously, the content creator can also define a specific set of rules dedicated to the type of content he creates and this set of rules is sent with the content.

The invention claimed is:

1. A multimedia content adaptation device for receiving input data understandable by a first device having characteristics according to a first profile and generating output data understandable by a second device having characteristics according to a second profile, comprising:
   means to extract information associated with a first profile,
   means to extract information associated with a second profile,
   means for providing a set of rules describing a way to modify the input data based on the information associated with said first profile and the information associated with said second profile, and
   means to modify the input data to be compatible with the information associated with said second profile according to said set of rules,
   wherein the multimedia content adaptation device comprises
      means to request additional rules when said set of rules cannot modify the input data to be compatible with the information associated with said second profile.

2. The multimedia content adaptation device according to claim 1, wherein said device includes means to store said set of rules and said additional rules.

3. The multimedia content adaptation device according to claim 1 wherein said set of rules and said additional rules are received with the input data.

4. The multimedia content adaptation device according claim 1 wherein said means to request additional rules sends a request to a user.

5. The multimedia content adaptation device according to claim 1 wherein said device is connected to one multimedia terminal.

6. The multimedia content adaptation device according to claim 5 wherein said multimedia terminal is linked to a server through a network, and wherein said server sends said input data that is understandable by a plurality of devices having information according to said first and second profiles, and said means to request additional rules sends a request to said server.

7. The multimedia content adaptation device according to claim 6 wherein said additional rules depend on the current profile of said multimedia terminal.

8. The multimedia content adaptation device according to claim 1 wherein said set of rules and said additional rules are classified according to a priority order.

9. The multimedia content adaptation device according to claim 1 wherein said first and second profiles are defined according to MPEG-4 profiles definition.

10. System comprising one first device which generates an output content compliant with a first profile and sent to at least one second device that can understand an input content compliant to a said second profile, characterized in that it comprises a device according to claim 1 which receives said output content compliant with said first profile and generates an output content compliant with said second profile for said second device.

11. Method for multimedia content adaptation comprising the steps of:
- receiving input data associated with a first profile,
- generating output data associated with a second profile,
- extracting information associated with the first profile,
- extracting information associated with the second profile,
- describing, with a set of rules, a process for modifying the input data according to the information associated with said first profile and to the information associated with said second profile,
- modifying the input data to be compatible with the information associated with said second profile according to the set of rules, and
- requesting additional rules when the said set of rules does not allow modifying information associated with said first profile into information associated with said second profile according to said set of rules.

12. Server for multimedia content adaptation comprising means to send data to at least one client terminal, said data being associated with at least a first profile and said client terminal being associated with at least a second profile, said client terminal associated with a set of rules for converting said data associated to a first profile into data associated with said second profile, said server being characterized in that it comprises means to send additional rules to at least one of the client terminals upon request of said client terminal when said client terminal can not convert said data associated with the first profile into data associated with the second profile.

13. The method of claim 12, wherein said method is to be implemented by a computer.

* * * * *